United States Patent Office 3,444,293
Patented May 13, 1969

3,444,293
MULTIFUNCTIONAL LARYNGOTRACHEITIS VACCINE AND METHOD OF MAKING THE SAME

Charles B. Hudson, New Brunswick, N.J., assignor to Vineland Poultry Laboratories, a partnership No Drawing. Filed Aug. 24, 1964, Ser. No. 391,741
Int. Cl. A61k *23/00;* C12k *7/00*
U.S. Cl. 424—89 11 Claims This invention relates to an attenuated laryngotracheitis virus vaccine and to a method of producing the same, and more particularly to a laryngotracheitis virus vaccine which has full antigenic effectiveness and which uniquely can be administered to fowl ocularly, intranasally, intratracheally or in their drinking water without any adverse reaction in the birds.

Heretofore, the conventional method for control of infectious laryngotracheitis in fowl has been to vaccinate the bird with the live laryngotracheitis vaccine via the cloaca. In this method, the mucous membrane of the upper wall of the cloaca is exposed and the vaccine is brushed on the exposed membrane. A successful vaccination is characterized by swelling of the mucous membrane and varying degrees of redness. The reaction is usually evident beginning at the fourth day, and the vaccination is complete usually by the tenth day.

Past history has shown that the vent or cloacal method of application provides the only effective means of immunizing. Introduction of the vaccine through other channels, such as intraocular installation, intranasal or intratracheal, usually results in causing the bird to come down with the disease. Hence, this method of vaccination is quite limited and suffers from this and other disadvantages.

For example, the method is slow since the cloaca of each bird must be exposed by hand to receive the live virus. Also the feces of the vaccinated flock contaminates the surrounding area and anyone passing through the area can carry the disease to other flocks which have not been vaccinated. As previously mentioned, when the conventional live virus vaccine is administered to birds ocularly, intranasally, intratracheally or in drinking water for effective immunization against laryngotracheitis disease without causing death or adverse reactions in the birds as has been heretofore experienced when such modes of vaccination were attempted. It was completely surprising and unexpected that such results could be achieved by producing attenuated live virus vaccine in accordance with the invention, and it can be appreciated that the ease and convenience provided by the new modes of administration which are made possible by the novel vaccine makes the invention highly valuable and a significant advance in the art.

The novel attenuated laryngotracheitis virus vaccine of the invention is made by passing laryngotracheitis virus serially in fertile avian eggs. As is conventional, the avian egg of 9–12 days, maturity is prepared for inoculation by puncturing a hole into the egg above the air cell. The area around the hole is kept in a sterile condition by smearing a suitable disinfectant compound such as iodine or tincture of metaphen. A conventional laryngotracheitis virus is then introduced into the egg by one of two methods. The virus can be placed on the intact shell membrane underlying the air cell and then the shell membrane pierced to allow the virus to penetrate the embryonic content and particularly the chorioallantoic membrane. Alternatively, the virus can be injected directly into the chorioallantoic membrane. The egg is then incubated at normal incubation temperature preferably from about 97° F. to about 99° F. for a period of about five days, which has been found to evoke the best growth response. The virus will be found almost exclusively on the chorioallantoic membrane although some growth is found in other parts of the embryo. The embryonic matter containing the virus is then harvested and the process is repeated using the harvested material so obtained as the new inoculant. Although any part of the embryo containing the laryngotracheitis virus can be harvested and used as the inoculant, it is preferred to use the chorioallantoic membrane because of the large growth of virus thereon.

The original virus strain may or may not be highly virulent or antigenic. Scientific work has shown that the repeated passage of a virus may enhance, or decrease its virulence or antigenicity. This invention can be applied to laryngotracheitis virus strains which show high virulence when applied to the respiratory tract of birds, and which produce the typical reactions noted previously when applied as a vaccine to the cloaca. With the Hudson strain, which is one such virulent strain, it was found that 191 passages through embryonated eggs brought about a change in the original material which was new, novel and unexpected in that, the attenuated virus could be administered ocularly, intranasally or intracheally without causing morbidity and yet produce a high degree of immunity. With other strains, more or less serial passages may be required to achieve the characteristic capability of administering the attenuated live virus vaccine ocularly, intranasally, intratracheally or in the drinking water provided by the invention.

In producing a vaccine from the attenuated antigenically effective live virus obtained by serial passages, the virus is first inoculated into a sufficient number of fertile avian eggs to produce any desired quantity of vaccine. Preferably the chorioallantoic membrane of the eggs, containing the major growth of attenuated virus, are then removed by forceps or other means from the eggs. This is done preferably five days after the inoculation of the eggs which gives optimum growth of virus, as previously mentioned.

The chorioallantoic membranes are pooled and are ground or masticated in a conventional apparatus. The membranes and grinding apparatus are maintained at a cool temperature throughout the operation, preferably below room temperature.

Specific aliquots of the masticated material may be suspended in a buffered glycerine solution and used as a vaccine, or the material may be dried by any of the conventional methods.

If a dried material is used, the operator inoculating the fowl will add a diluent such as water, glycerin or a physiological saline solution to reconstitute the vaccine to a liquid form suitable for administration. The powdered vaccine may be aliquoted in 5 cc. portions to each of which 30 cc. of the diluent is added. This will provide sufficient material to vaccinate 1000 birds. This proportion of vaccine diluent is arbitrary and more or less amounts of virus may be used, depending upon the virus content of the material and the method of administration used.

Further details of the invention will be illustrated in the following examples which are intended to be illustrative only and not limitations of the invention.

EXAMPLE 1

A fertile, embryonated chicken egg which had been incubated twelve days was prepared for inoculation by piercing the shell of the egg above the air space and sterilizing the area around the hole by swabbing with tincture of metaphen.

The inoculant was obtained by removing the cheesy membrane containing laryngotracheitis virus from the trachea of five pullets who had died of infectious laryngotracheitis. The virus strain, present in the birds and later identified as the Hudson strain, was then passed through a Berkefeld filter and the filtrate inoculated into the chorioallantoic membrane.

The egg was incubated for five days at 98° F. and the chorioallantoic membrane was then harvested and masticated by conventional methods. The resulting material was then reinoculated into another egg in the manner described for the first egg. After 191 serial passages were made in this fashion, the virus obtained from the 191th passage was inoculated intranasally, intratracheally and introcularly into ten four-week old susceptible chickens. There was no evidence of any infection or adverse reaction in the birds.

These same birds were then challenged with a field laryngotracheitis virus as were six birds which had not received the original inoculations. The field virus was administered to the birds ocularly, intratracheally and intranasally. The ten birds which were originally vaccinated with the attenuated virus showed no signs or symptoms of infectious laryngotracheitis. The unvaccinated control birds all became ill and by the fifth day two of the birds died.

EXAMPLE 2

A 5 cc. sample of the attenuated virus prepared in accordance with Example 1 was diluted in 50 cc. of water for use in inoculating 360 embryonated eggs. The eggs used were between 9 and 12 days old and were prepared by piercing the eggs above the air cell and sterilizing the area by applying tincture of metaphen. The inoculant (the attenuated virus prepared in accordance with Example 1) was inoculated into the chlorioallantoic membrane of each egg. The eggs were then allowed to incubate for five days at 98° F. After the fifth day, 50 of the embryos in the eggs had died, including 30 which died within the first 24 hours, from shock and had to be discarded for lack of harvestable virus growth.

The chorioallantoic membranes were then removed from all but the 30 discarded eggs and masticated in a Waring Blendor. The blender was kept cool during this treatment. The ground material was then placed in an Eppenbach mill to further reduce the particle size.

The material was then quick frozen and dried under vacuum to produce a vaccine powder. 5 cc. of the dry material was added to 30 cc. of water and the resulting liquid vaccine administered to 8-, 9- and 10-week old pullets by way of the sinus and the eye without any adverse reaction in the birds.

A portion of the dry material was titrated against live embryos. The vaccine in this case was found to have a titre of $10^{-4.7}$ to $10^{-5.4}$ $EID_{50}$ per 5 cc.

EXAMPLE 3

The process in accordance with Example 2 was repeated and the material obtained thereby was administered ocularly, intratracheally and intranasally in 5-, 6- and 13-week-old pullets without any adverse effects in the birds. These same birds were then challenged, as well as a control group of pullets of the same age, with a 0.2 cc. of a field laryngotracheitis virus. The vaccinated group showed no signs of the disease. The control group showed the usual symptoms of the disease after the 4th day.

EXAMPLE 4

0.2 cc. of the vaccine prepared in accordance with Example 2 was administered by way of the trachea to ten 6-week-old birds. Five control birds in the same pen were not immunized nor five other control birds which were maintained in another area. Four days later, five of the immunized birds were killed and their tracheas removed. One of the tracheas contained some caseous exudate and the other four contained small amounts of slightly yellowish mucous.

The five tracheas and their contents were mixed with a 100 cc. solution containing penicillin, streptomycin and mycostatin and the mixture blended in a chilled Waring Blendor for 4 minutes. The blended material was then transferred to a centrifuge and centrifuged lightly for 2 minutes. The supernatant fluid was removed and quick frozen. This material was later diluted in water by a factor of 1:6 and 0.2 cc. of the diluted vaccine was administered to another group of 10 birds as described above.

The foregoing process was repeated five times, and each time the supernatant liquid from the preceding centrifuged tracheaantibiotic mixture was used for the subsequent inoculation.

In all five cases, both the immunized and control birds were challenged with a double dose of a field laryngotracheitis virus. Each bird received a 0.4 cc. dose of the virus, 0.2 cc. being administered intraocularly and the remaining 0.2 cc. by way of the sinus. All the immunized birds showed no signs of infectious laryngotracheitis. The control birds, both exposed and unexposed, showed the usual symptoms of the disease within four days of receiving the challenge dose of laryngotracheitis.

It will be understood that it is intended to cover all changes and modifications of the preferred embodiments of the invention, herein chosen for the purpose of examples, which do not constitute departures from the spirit and scope of the invention.

What is claimed is:

1. A process for preparing an attenuated laryngotracheitis virus vaccine which can be safely administered ocularly, intranasally, intratracheally and in drinking water for immunizing fowl against infectious laryngotracheitis comprising the steps of introducing a virulent, infectious laryngotracheitis virus into a fertile avian egg, incubating the egg at growth sustaining temperatures until a harvestable quantity of laryngotracheitis virus has grown therein, harvesting said laryngotracheitis virus by removing and infected portion of the embryonic content of the egg, reintroducing the virus so harvested into a second fertile avian egg and repeating such culture passage of the virus for a sufficient number of passages to produce an attenuated antigenically-effective laryngotracheitis virus which can be safely administered ocularly, intranasally, intratracheally and in drinking water.

2. A process as in claim 1 wherein the infected portion of the embryonic content of the egg is the chorioallantoic membrane.

3. A process for preparing an attenuated laryngotracheitis virus vaccine which can be safely administered ocularly, intranasally, intratracheally or in drinking water for immunizing fowl against infectious laryngotracheitis comprising the steps of introducing a virulent, infectious laryngotracheitis strain into a fertile avian egg, incubating the egg at a temperature from about 97° F. to about 99° F. until a harvestable quantity of laryngotracheitis virus has grown therein, harvesting said laryngotracheitis virus by removing an infected portion the embryonic content of the egg, reintroducing the virus so harvested into a second fertile avian egg and repeating such culture passage of the virus for 191 passages to produce an attenuated antigenically effective laryngotracheitis virus which can be safely administered ocularly, intranasally, intratracheally and in drinking water.

4. A process as in claim 3 wherein the infected portion of the embryonic content of the egg is the chorioallantoic membrane.

5. A process for preparing an attenuated laryngotracheitis virus vaccine which can be safely administered ocularly, intranasally, intratracheally and in drinking water to immunize fowl against infectious laryngotracheitis which comprises the steps of introducing an attenuated laryngotracheitis virus into a fertile avian egg, incubating the egg at a temperature from about 97° to about 99° F. until a harvestable quantity of said attenuated laryngotracheitis virus has grown in the egg, and removing from the egg a portion of its embryonic content upon which said harvestable quantity of the attenuated laryngotracheitis virus has grown, said attenuated laryngotracheitis virus having been produced by introducing a virulent infectious laryngotracheitis virus into a fertile avian egg, incubating the egg at a temperature from about 97° to about 99° F. until a harvestable quantity of the virulent, infectious laryngotracheitis virus has grown in the egg, removing from the egg a portion of its embryonic content upon which the harvestable quantity of the virulent, infectious laryngotracheitis virus has grown, reintroducing the virulent, infectious laryngotracheitis virus so harvested into a second fertile avian egg and repeating such culture passage of the virulent, infectious laryngotracheitis virus for a sufficient number of passages to produce an antigenically-effective attenuated laryngotracheitis virus which can be safely administered ocularly, intranasally, intratracheally and in drinking water.

6. A process as in claim 5 which further includes the step of removing the chorioallantoic membrane from the egg in order to recover the harvestable quantity of attenuated laryngotracheitis virus grown thereon.

7. A process as in claim 5 which further includes the steps of masticating the removed portion of the embryonic content upon which the harvestable quantity of the attenuated laryngotracheitis virus has grown, freezing the masticated material and then drying the frozen masticated material under vacuum to prouce a dry powder.

8. An attenuated laryngotracheitis vaccine produced by the method which comprises the steps of introducing a virulent, infectious laryngotracheitis virus into a fertile egg, incubating the egg for about 5 days at a temperature from about 97° to about 99° F. until a harvestable quantity of laryngotracheitis virus has grown in the egg, removing from the egg a portion of its embryonic content upon which said harvestable quantity of the laryngotracheitis virus has grown, reintroducing the virus so harvested into a second fertile avian egg, repeating such culture passage of the laryngotracheitis virus for a sufficient number of passages to produce an antigenically-effective attenuated laryngotracheitis virus which can be safely administered ocularly, intranasally, intratracheally and in drinking water, and removing from the egg of the last passage a portion of its embryonic content upon which a harvestable quantity of the attenuated laryngotracheitis virus has grown.

9. A vaccine as in claim 8 wherein said last removed portion is in the form of a powder suspended in a liquid selected from the group consisting of water, glycerine, saline solutions and mixtures thereof.

10. A vaccine as in claim 8 having a titre range of $10^{-4.7}$ to $10^{-5.4}$ $EID_{50}$ per 5 cc.

11. A vaccine as in claim 8 wherein said production method is performed by introducing an already attenuated laryngotracheitis virus into said fertile egg and wherein said last removed portion is converted into a dry powder, said already attenuated laryngotracheitis virus having been produced by introducing a virulent infectious laryngotracheitis virus into a fertile avian egg, incubating the egg for about 5 days at a temperature from about 97° to about 99° F. until a harvestable quantity of the virulent infectious laryngotracheitis virus has grown in the egg, removing from the egg a portion of its embryonic content upon which the harvestable quantity of the virulent infectious laryngotracheitis virus has grown, reintroducing the virulent infectious laryngotracheitis virus so harvested into a second fertile avian egg and repeating such culture passage of the virulent infectious laryngotracheitis virus for a sufficient number of passages to produce an antigenically-effective attenuated laryngotracheitis virus which can be safely administered ocularly, intranasally, intratracheally and in drinking water.

References Cited

UNITED STATES PATENTS 3,331,736   7/1967   Gelenczei.

OTHER REFERENCES

Veterinary Bulletin (I), vol. 6, p. 133, 1936, citing Brandly, J. Infect. Dis., 57: 201–206 (1935).

Veterinary Bulletin (II), vol. 10, p. 339, 1940, citing J. Am. Vet. Med. Assn. 95: 333–339 (1939).

RICHARD L. HUFF, *Primary Examiner.*

U.S. Cl. X.R.

195—1.3

UNITED STATES PATENT OFFICE
CERTIFICATE OF CORRECTION

Patent No. 3,444,293                                                  May 13, 1969

Charles B. Hudson

It is certified that error appears in the above identified patent and that said Letters Patent are hereby corrected as shown below:

Column 1, line 43, after "water" insert -- it will cause severe tracheal reaction with dyspnoea and possibly death.

In accordance with the present invention, a novel attenuated laryngotracheitis virus vaccine has been discovered which for the first time can be administered ocularly, intranasally, intratracheally or in drinking water --. Column 2, line 22, "intracheally" should read -- intratracheally --. Column 3, line 46, "10-week" should read -- 11-week --. Column 4, line 36, "and" should read -- an --.

Signed and sealed this 14th day of April 1970.

(SEAL)
Attest:

Edward M. Fletcher, Jr.                                  WILLIAM E. SCHUYLER, JR.
Attesting Officer                                            Commissioner of Patents